United States Patent [19]

Case et al.

[11] Patent Number: 4,777,588

[45] Date of Patent: Oct. 11, 1988

[54] GENERAL-PURPOSE REGISTER FILE OPTIMIZED FOR INTRAPROCEDURAL REGISTER ALLOCATION, PROCEDURE CALLS, AND MULTITASKING PERFORMANCE

[75] Inventors: Brian W. Case; Rod G. Fleck, both of Mountain View; William M. Johnson; Cheng-Gang Kong, both of San Jose, all of Calif.; Ole Moller, Nivaa, Denmark

[73] Assignee: Advanced Micro Devices, Inc., Sunnyvale, Calif.

[21] Appl. No.: 771,311

[22] Filed: Aug. 30, 1985

[51] Int. Cl.[4] .............................................. G06F 9/34
[52] U.S. Cl. .................................................... 364/200
[58] Field of Search ... 364/200 MS File, 900 MS File, 364/300

[56] References Cited

U.S. PATENT DOCUMENTS 3,461,433  8/1969  Emerson ............................. 364/200
4,037,214  7/1977  Birner et al. ....................... 364/200

OTHER PUBLICATIONS

IEEE Computer, Sep. 1982, article by Patterson and Séquin entitled "A VLSI RISC", pp. 8-18.

Primary Examiner—Thomas M. Heckler
Assistant Examiner—Paul V. Kulik
Attorney, Agent, or Firm—Kenneth B. Salomon; J. Vincent Tortolano

[57] ABSTRACT

A high speed register file for use by an instruction processor suitable for reduced instruction-set computers (RISCs) is disclosed which is preferably used with an efficient register allocation method. The register file facilitates the passing of parameters between procedures by dynamically providing overlapping registers which are accessible to both procedures. Each procedure also has a set of "local" registers assigned to it which are inaccessible from other procedures. The register file is divided into a number of blocks and a protection register stores a word which proscribes access by a particular procedure or task to certain blocks. In this manner, an instruction processor using the register file can operate on multiple tasks maintaining the integrity of each from undesired changes occuring in the others.

12 Claims, 2 Drawing Sheets

GENERAL-PURPOSE REGISTER FILE OPTIMIZED FOR INTRAPROCEDURAL REGISTER ALLOCATION, PROCEDURE CALLS, AND MULTITASKING PERFORMANCE

This invention relates to storage elements of digital computers, and more particularly, to a high-speed general-purpose register file for use with a reduced instruction-set computer providing ready parameter-passing between procedures and a protection mechanism supporting multiple tasks.

BACKGROUND OF THE INVENTION

Reduced instruction set computers (RISC) recognize the advantages of employing a set of high-speed, general-purpose registers for the storage of often-used data in conjunction with a lower-speed main memory for the storage of less-frequently used data. Run-time studies of programs indicate that the data most often-used in procedures are typically simple, non-array variables, and not in excess of thirty-two such variables are used with a procedure. The Berkeley RISC machines RISC I and RISC II, the Stanford MIPS machine, and the IBM 801 are representative of RISC architectures.

At run-time, a stack is used in allocating and deallocating activation records whenever a procedure of a high-level language (HLL) is invoked or returned from, respectively. The activation record includes portions for incoming parameters (variables), purely local variables, and outgoing parameters (variables). The portion allocated to the outgoing parameters of one activation record of a procedure may be overlapped with the portion allocated to the incoming parameters of another activation record of another procedure so that parameter values may be efficiently communicated between the procedures.

A compiler for a HLL arranges data references within a procedure so that most references are to the high-speed registers to improve performance. RISC architecture machines contain a set of high-speed registers which exceeds the number required for the storage of often-needed data within any given procedure, for example, thirty-two registers. The Berkeley RISC machines assign a fixed number of registers to a procedure ("window"). Since this number is generally larger than that actually required by a procedure, waste of registers is inevitable.

Ideally, only the number of registers actually required by a procedure should be allocated for it and the registers in excess of those required could be used to store variables for communication between procedures, and for other tasks.

SUMMARY OF THE INVENTION

The instruction processor of the instant invention provides a high-speed register file in which only that number of registers required by a procedure is allocated to it. Registers which are in excess of those required for a given procedure may be used to store variables for other procedures or tasks. Communication between multiple procedures may occur via variables contained in a set of so-called "global" registers, while variables required for a given procedure are stored in a set of so-called "local" registers, each set with its own address space.

Parameters may be passed from a calling procedure to a called procedure via a stack mechanism. Accesses to local registers are relative to a stack pointer value stored in a register. The contents of the stack pointer register may be adjusted so that the set of registers used by a calling and a called procedure overlap and communication therebetween is via the registers in common.

A register protection mechanism supports a multitasking environment in which each task maintains integrity from any undesired changes occuring in other tasks. The protection mechanism proscribes access of certain registers within the high-speed register file during the execution of a particular procedure or task. The register file is divided into a number of "blocks" of contiguous registers. A protection register contains a binary word each bit position of which can be set to either permit access or deny access to the block corresponding to the particular bit position. An attempt by an instruction to access a register within a protected block causes a machine "fault" and appropriate remedial action is undertaken. Accordingly, variables for multiple tasks can be stored in separate blocks within the register file, the variables for each task protected from access by other tasks.

DETAILED DESCRIPTION OF THE PREFERRED EMBODIMENT

Figure 1:
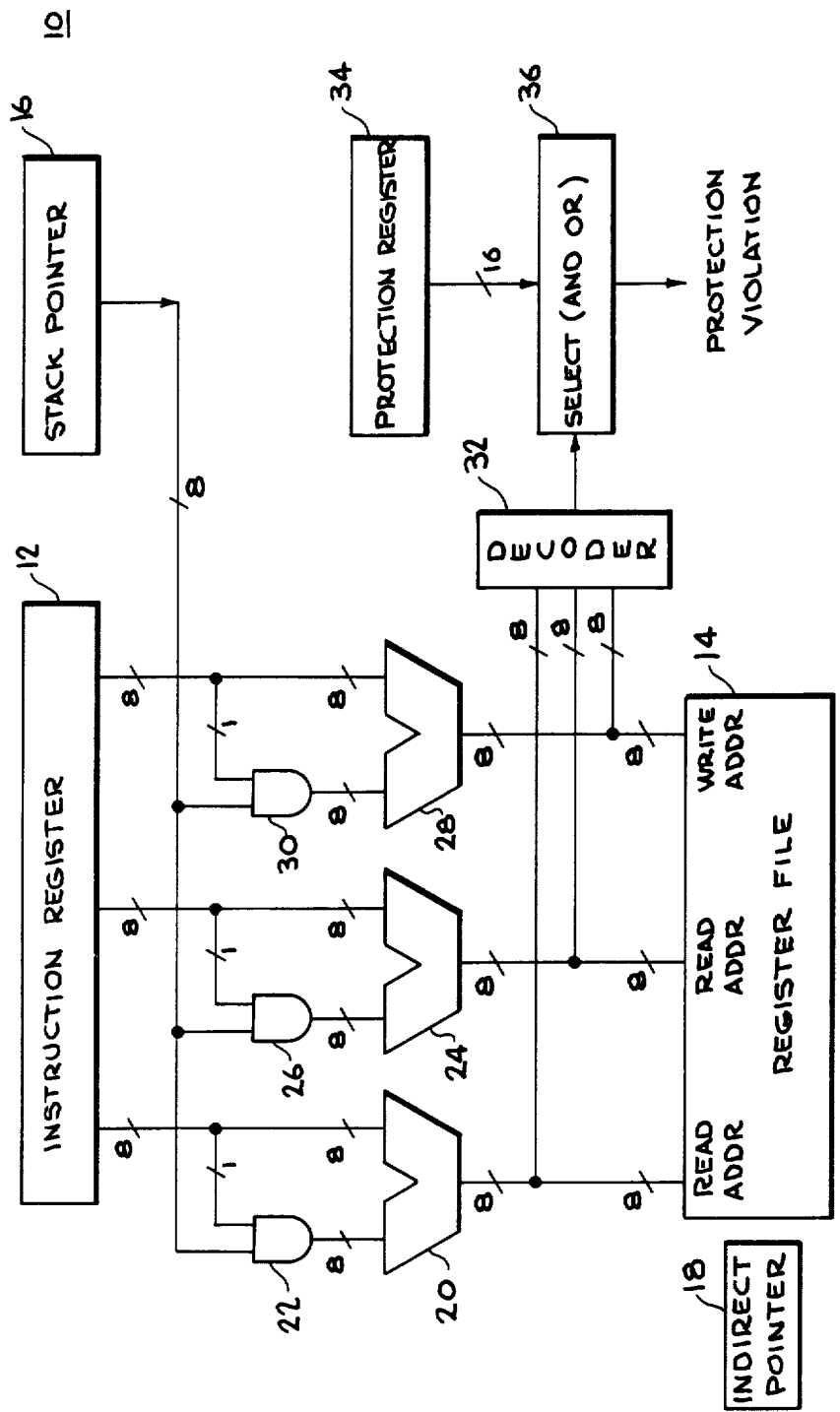
FIG. 1 is a block diagram of an instruction processor employing a register file of the instant invention.

The register file of the instant invention is best understood with reference to FIG. 1, a block diagram of the control portion of an instruction processor 10 utilized in a reduced instruction set computer (RISC). While the register file will be explained herein in connection with processor 10, this is for the purposes of illustration only, and the various benefits and advantages provided by the register file are available in a wide range of applications, as will be appreciated by those skilled in the art.

As shown in FIG. 1, processor 10 includes an instruction register 12 which stores the processor instruction, in binary form, which has been fetched from an instruction cache, not shown. Most processor instructions specify a pair of operands, being the two sources of data to be processed, and a third operand, being the destination where the resulting value is to be stored. Normally, these operands are in registers located within the register file 14, of the present invention. The file, in the preferred embodiment, contains 128 so-called "global" registers for storage of simple, non-array, variables common to several procedures and 128 so-called "local" registers for storage of simple variables and parameters used within a single procedure. The register file 14 is intended for storage of often-used data, as will be explained below.

Although shown external to register file 14, the processor 10 contains a stack pointer (SP) register 16 which is located within file 14 as register number 3, and an indirect pointer (IP) register 18 as register number 2. Register file 14 also contains as register number 1, a register which when specified in an instruction causes the local register within file 14 whose address is stored in bit positions 2–8 of the IP register 18 to be accessed. A register number 0, a register within file 14 which when specified causes the global register within file 14 whose address is stored in bit positions 2–8 of the IP register to be accessed. Signals representing the operand portions of the instruction stored in instruction register 12 are conducted to one of three two-input summers: a first summer 20 receives at a first input a signal representing the first operand of the instruction stored in register 12 and signals representing the contents of the SP register 16 are conducted to a second input of summer 20 via an AND gate 22. AND gate 22 also receives a signal corresponding to the most significant bit (msb) of the first operand of the instruction stored in register 12.

A second summer 24 and a third summer 28 receive at a first input signals representing the second and third operand, respectively, of the instruction stored in register 12 and signals representing the contents of the SP register 16 are conducted to a second input of summers 24 and 28 via AND gates 26 and 30, respectively. AND gate 26 and AND gate 30 also receive a signal corresponding to the msb of the second, and third, respectively, operand of the instruction stored in register 12.

Signals generated at an output of summers 20 and 24 are conducted to a first and second, respectively, read address (READ_ADDR) input of register file 14, as well as to a first and second, respectively, input to a decode circuit 32. Signals generated at an output of summer 28 are conducted to a write address (WRITE_ADDR) input of register file 14, as well as to a third input of decode circuit 32.

Figure 3:
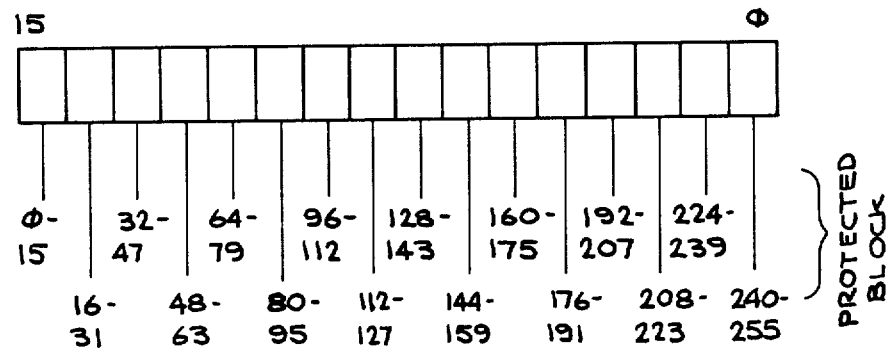
FIG. 3 illustrates the protection register used in conjunction with the register file of the instant invention.

A protection register 34 contains information which specifies which of certain registers within register file 14 may be accessed by the instruction stored in register 12, as will be described below in connection with FIG. 3. Signals representing this protection information are conducted to a combinatorial select circuit 36 which also receives signals generated by the decode circuit 32. Select circuit 36 generates at an output a signal indicative of an attempt by the instruction in register 12 to access a particular register in file 14 which is protected according to the contents of protection register 34. A computer "fault" would be detected in this event and appropriate action would be undertaken. In this manner, quick switching from one task to another in a multitasking environment is facilitated so that variables for each task are protected from access by other tasks by the ability to proscribe access of certain registers within file 14 by specifying a particular bit pattern in protection register 34, as will be described below in connection with FIG. 3.

The operation of the SP register 16 and the IP register 18 is best described in conjunction with Table I, below. Four modes of addressing the registers within file 14 are permitted by processor control 10, and they are determined by the value n shown in the first column of Table I as specified by the operands of the instruction stored in register 12.

TABLE I

| REGISTER FILE ADDRESSING MODES | |
| --- | --- |
| Register Specification, n | Register |
| 0 | Global Register [$IP_{8-2}$] |
| 1 | Local Register [$IP_{8-2}$] |
| 2 to 127 | Global Register [n] |
| 128 to 255 | Local Register [($SP_{8-2}$ + n) mod 128] |

An instruction having an operand, n, $2 <= n <= 127$, will refer to the "global" register within file 14 located at the address n within file 14. Since the msb in the eight-bit binary representation of n will be ZERO in this case, the summer 20, 24 or 28 will receive a set of ZEROS from the AND gate 22, 26 or 30, respectively, and accordingly, signals representing the value n received from the operand of the instruction in register 12 will be generated without modification at the output of summer 20, 24 or 28. Thus the global register n within file 14 will be used for reading or writing, as the signals generated by summer 20, 24 or 28 will be supplied to the first or second READ_ADDR input of file 14 or the WRITE_ADDR input of file 14, in accordance with row three of Table I.

An instruction having an operand, n, $128 <= n <= 255$, will have an eight-bit binary representation in which the msb will be ONE and the AND gate 22, 26 or 30, respectively, will pass signals corresponding to the contents of the SP register 16 to the second input of summer 20, 24 or 28. Accordingly, the signals representing the value n received from the operand of the instruction in register 12 will be increased by the value in the SP register 16 in summer 20, 24 or 28, respectively. In this manner references to "local" registers within file 14 are relative to the contents of the SP register 16, in accordance with row four of Table I. Hence access to local registers may be adjusted so that the set of contiguous registers with file 14 used by one procedure may overlap those used by another procedure as will be described below in connection with FIG. 2.

By specifying with the instruction stored in register 12 a register value n of 0, reference is had to the global register within file 14 whose address is stored in bit positions 2–8 of the IP register 18, in accordance with row one of Table I. And specifying a value of 1 for n, reference is had to the local register within file 14 whose address is stored in bit positions 2–8 of the IP register 18, in accordance with row two of Table I. The mechanism by which this "indirect" addressing mode is implemented is well known to those skilled in the art and will not be described herein.

The set of local registers within file 14 used by a pair of nested procedures A and B, will be described with reference to FIG. 2. Upon entry to procedure A the contents of the SP register 16 is set to point to a particular local register 100. For the procedure A illustrated in FIG. 2, registers 100, 102, 104 and 106 are allocated for variables purely local to procedure A. As such, upon entry to procedure B, the contents of the SP register 16 is set to point to local register 108. However, local registers 108, 110 and 112 were allocated to procedure A for variables common to both procedure A and procedure B. Hence, communication between these procedures is by way of local registers 108, 110 and 112. Local registers 114, 116, . . . , 130 are allocated for variables purely local to procedure B, although if a procedure C were to be called from procedure B, a set of the latter registers ending with 130 may be used for communication between procedures B and C by setting the contents of SP register 16 so as to point to a local register 114, . . . , 130.

Figure 2:
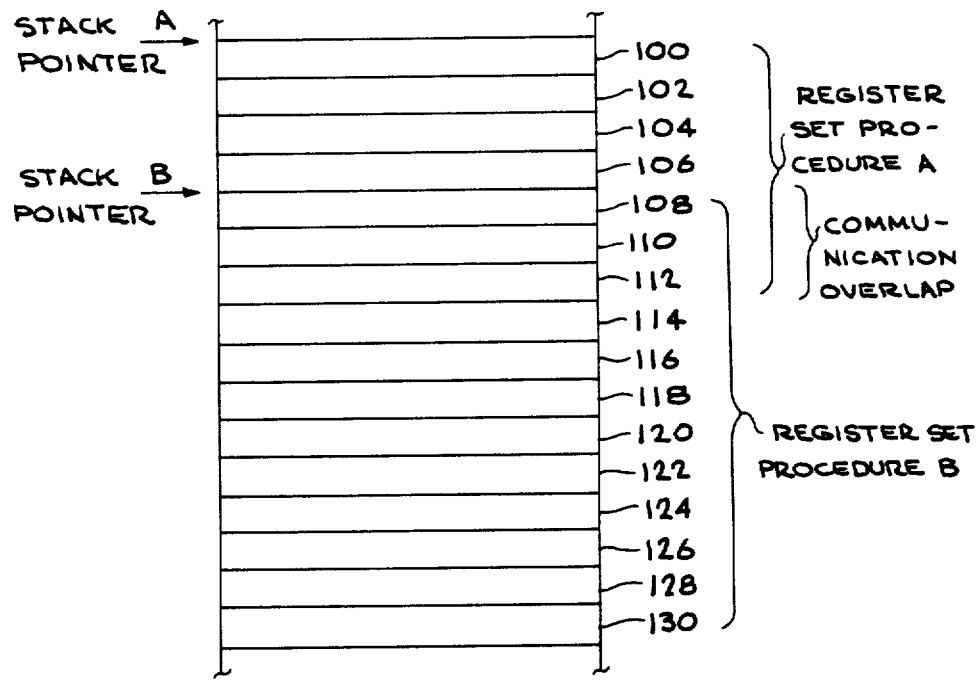
FIG. 2 illustrates the use of a stack pointer in allocating local registers in the file of the instant invention.

In addition to the inter-procedural communication illustrated in FIG. 2, communication between multiple procedures may occur via variables stored in the "global" register portion of file 14, i.e., those registers in file 14 having addresses 2 through 127.

The register file 14 of the instant invention is preferably used in conjunction with a protection mechanism afforded by the protection register 34 illustrated in FIG.

3. In the preferred embodiment, register file 14 consists of 256 registers divided into 16 blocks of 16 contiguous registers each. The protection register 34 comprises a 16-bit register capable of storing a 16-bit binary value specifying by, for example, a binary ONE, that a particular block is proscribed access. An exemplary coding technique is shown in FIG. 3 in which the msb, position 15, of register 34 corresponds to the block of registers having addresses with file 14 of 0 through 15, inclusive, position 14 corresponds to the block of registers having addresses 16 through 31, etc.

During the decoding of the instruction stored in register 12, the effective address of the operands are conducted to decode circuit 32 and a comparison made by select circuit 36 between the operand addresses and the proscribed addresses as specified by the contents of register 34. The select circuit 36 generates a protection violation signal upon detection of an attempt to access a proscribed register within file 14 and a "fault" is generated which interrupts processing of the instruction by processor 10 so that remedial action may be undertaken.

In this manner variables for multiple tasks may be simultaneously stored within register file 14 within different blocks, and variables for each task will be protected from access by other tasks.

We claim:

1. A reduced instruction set digital processor control providing dynamic execution-time storage allocation which cyclically executes instructions each including a plurality of operand portions, comprising;
   stack means for execution-time generation of storage allocation signals;
   means responsive to said storage allocation signals and to said plurality of instruction operand portions for generating a plurality of signals each indicative of a location of one of said operand portions; and
   file means having a plurality of registers each having a location designator, responsive to said plurality of operand location signals for reading the contents of one of said registers having a location designator specified by a predetermined one of said operand location signals and for writing the contents of one of said register having a second location designator specified by a predetermined one of said operand location signals.

2. A digital processor control according to claim 1 wherein said plurality of register within said file means includes a first set having contiguous location designators and a second set having contiguous location designators, said first and second set of designators bearing a predetermined numerical relationship with one another, said operand location signal generating means comprises;
   a plurality of logic circuit means each responsive to said storage allocation signal and to a predetermined portion of a predetermined one of said instruction operand portions for generating a relative location signal;
   a plurality of summing means each receiving at a first input signals representative of a predetermined one of said instruction operand portions and receiving at a second input said relative location signal generated by a predetermined one of said logic circuit means for generating a predetermined one of said operand location signals.

3. A digital processor control according to claim 1 further providing access protection of user-selectable ones of said register within said file means, further including means responsive to said plurality of operand location signals and to signals indicative of said user-selected register access protection for generating a protection violation signal.

4. A digital processor control according to claim 2 further providing access protection of user-selectable ones of said register within said file means, further including means responsive to said plurality of operand location signals and to signals indicative of said user-selected register access protection for generating a protection violation signal.

5. A digital processor control according to claim 3 wherein said registers within said file means are divided into a predetermined number of blocks, each block containing a predetermined number of registers having contiguous location designators; and wherein said protection violation signal generation means includes means for storing a plural-bit value indicative of said user-selected access protection, each bit position thereof corresponding to a predetermined one of said blocks.

6. A digital processor control according to claim 4 wherein said registers within said file means are divided into a predetermined number of blocks, each block containing a predetermined number of registers having contiguous location designators; and wherein said protective violation signal generation means includes means for storing a plural-bit value indicative of said user-selected access protection, each bit position thereof corresponding to a predetermined one of said blocks.

7. A digital processor control according to claim 1 wherein a predetermined one of said registers within said file means is an indirect pointer.

8. A digital processor control according to claim 1 wherein said plurality of operand portions comprises a first and second read operand and a first write operand.

9. A method of dynamic execution-time storage allocation by a reduced instruction set digital processor control which cyclically executes instructions each including a plurality of operand portions, predetermined sequences of said instructions forming a procedure, said control having a file of registers each having a location designator, said control having a stack pointer for said storage allocation, said method comprising the steps of:
   (a) setting said stack pointer upon entry to a procedure;
   (b) for each of said operand portions of said instructions within said procedure calculating an effective operand register designation relative to said stack pointer; and
   (c) resetting said stack pointer upon entry to a procedure called by said procedure entered at step (a) so as to provide a user-selectable communication overlap between the storage allocated for the procedure entered in step (a) and the storage allocated for said procedure called by said procedure.

10. An execution-time storage allocation method according to claim 9 wherein said file of registers is divided into a predetermined number of blocks, each block containing a predetermined number of registers having contiguous location designators further including the user-selectable register access protection steps of:
   (d) designating ones of said blocks as proscribed-access blocks;

(e) aborting execution of an instruction having an operand portion with an effective address as calculated at step (b) within one of said proscribed-access blocks.

11. An execution-time storage allocation method according to claim 10 wherein said digital processor control is capable of performing multiple tasks, further including the step of:
(f) for each task of said multiple tasks designating mutually-exclusive ones of said blocks as proscribed-access blocks.

12. An execution-time storage allocation method according to claim 9 wherein said file of registers has a first set of contiguous location designators and a second set of contiguous location designators, said first and second set of designators bearing a predetermined numerical relationship with one another, and wherein said calculation of an effective designator called for in step (b) is for a designator within said second set calculated by reference to said predetermined numerical relationship.

* * * * *